United States Patent
Kulkarni et al.

(10) Patent No.: US 12,052,455 B2
(45) Date of Patent: Jul. 30, 2024

(54) SYSTEM AND METHOD FOR DETECTING AND REPORTING CONCURRENT VIEWERSHIP OF ONLINE AUDIO-VIDEO CONTENT

(71) Applicant: Mux, Inc., San Francisco, CA (US)

(72) Inventors: Nidhi Kulkarni, San Francisco, CA (US); Philip Chang, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

(21) Appl. No.: 18/110,823

(22) Filed: Feb. 16, 2023

(65) Prior Publication Data

US 2023/0291945 A1    Sep. 14, 2023

Related U.S. Application Data

(63) Continuation-in-part of application No. 17/031,536, filed on Sep. 24, 2020, now Pat. No. 11,570,490, and a continuation-in-part of application No. 16/458,630, filed on Jul. 1, 2019, now Pat. No. 11,653,040, and a
(Continued)

(51) Int. Cl.
| | |
|---|---|
| H04N 7/16 | (2011.01) |
| H04N 21/2343 | (2011.01) |
| H04N 21/239 | (2011.01) |
| H04N 21/24 | (2011.01) |
| H04N 21/845 | (2011.01) |

(52) U.S. Cl.
CPC . *H04N 21/2407* (2013.01); *H04N 21/234309* (2013.01); *H04N 21/2393* (2013.01); *H04N 21/8456* (2013.01)

(58) Field of Classification Search
CPC ....... H04N 21/2407; H04N 21/234309; H04N 21/2393; H04N 21/8456; H04N 21/252; H04N 21/812
See application file for complete search history.

(56) References Cited

U.S. PATENT DOCUMENTS

| | | | |
|---|---|---|---|
| 9,363,556 B1 * | 6/2016 | Sharkey | ............. H04N 21/4402 |
| 9,819,972 B1 * | 11/2017 | Vantalon | .............. H04N 21/643 |
| 11,172,243 B2 * | 11/2021 | Bhudavaram | .... H04N 21/44218 |

(Continued)

*Primary Examiner* — Annan Q Shang
(74) *Attorney, Agent, or Firm* — Run8 Patent Group, LLC; Peter Miller (57) ABSTRACT

A method includes, at a first time: receiving, from a first viewer population, a first request for a first playback segment of a video; generating a first rendition segment corresponding to the first playback segment; transmitting the first rendition segment to the first viewer population; aggregating a first set of viewership data for the first playback segment; and generating a first viewership count based the first set of viewership data, the first viewership count corresponding to a viewership data filter. In addition, the method includes, at the second time: receiving a second request from the second viewer population for a second playback segment of the video; generating the second rendition segment corresponding to the first playback segment; modifying frames of the second rendition segment to include the first viewership count; and transmitting the second modified rendition segment to the second viewer population and the first viewership count.

20 Claims, 5 Drawing Sheets

Related U.S. Application Data continuation-in-part of application No. 15/875,796, filed on Jan. 19, 2018, now Pat. No. 10,798,434.

(60) Provisional application No. 63/310,973, filed on Feb. 16, 2022, provisional application No. 62/905,230, filed on Sep. 24, 2019, provisional application No. 62/694,408, filed on Jul. 5, 2018.

(56) References Cited

U.S. PATENT DOCUMENTS

| | | | |
|---|---|---|---|
| 2015/0296228 A1* | 10/2015 | Chen | H04N 21/8126 |
| | | | 725/34 |
| 2017/0055007 A1* | 2/2017 | Phillips | H04N 21/2393 |
| 2019/0069038 A1* | 2/2019 | Phillips | H04N 21/64769 |
| 2021/0142269 A1* | 5/2021 | Sivaswamy | G06V 20/20 |
| 2022/0095001 A1* | 3/2022 | Harviainen | H04N 21/6587 |

* cited by examiner

SYSTEM AND METHOD FOR DETECTING AND REPORTING CONCURRENT VIEWERSHIP OF ONLINE AUDIO-VIDEO CONTENT

CROSS-REFERENCE TO RELATED APPLICATIONS

This application claims the benefit of U.S. Provisional Application No. 63/310,973, filed on 16 Feb. 2022, which is incorporated in its entirety by this reference.

This application is a continuation-in-part application of: U.S. patent application Ser. No. 17/031,536, filed on 24 Sep. 2020, which claims the benefit of U.S. Provisional Application No. 62/905,230, filed on 24 Sep. 2019; U.S. patent application Ser. No. 16/458,630, filed on 1 Jul. 2019, which claims the benefit of U.S. Provisional Application No. 62/694,408, filed on 5 Jul. 2018; and U.S. patent application Ser. No. 15/875,796, filed on 19 Jan. 2018 each of which is incorporated in its entirety by this reference.

TECHNICAL FIELD

This invention relates generally to the field of internet video streaming and more specifically to a new and useful method for viewership reporting in the field of internet video streaming.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-7, a method S100 includes, during a first time period: receiving a set of beacon streams from a set of video player instances, each beacon stream in the set of beacon streams including an asset ID (e.g., a unique identifier); identifying a subset of beacon streams in the set of beacon streams characterized by a target asset ID corresponding to a target audio-video (hereinafter "AV") asset; incrementing a viewership counter based on a set of view-start events in the subset of beacon streams; and decrementing the viewership counter based on a set of view-end events (e.g., detected view-end events, inferred view-end events) in the subset of beacon streams. The method S100 also includes: at a first time during the first time period, receiving a request for viewership data for the target AV asset via a content distribution network from a viewing device viewing the target AV asset; retrieving a first value of the viewership counter at the first time; and transmitting the first value of the viewership counter to a viewing device via the content distribution network for rendering at the viewing device.

1.1 First Variation

As shown in FIGS. 1-7, one variation of the method S100 includes: at a first time, receiving, from a first viewer population, a first request for a first playback segment of a video in a first rendition, the first playback segment defining a first playback interval in the video and corresponding to a first mezzanine segment in a first mezzanine encoding in Block S110, generating a first rendition segment by transcoding the first mezzanine segment into a first rendition segment into the first rendition in Block S120; transmitting the first rendition segment to the first viewer population in Block S130; aggregating a first set of viewership data for the first playback segment in Block S140; and generating a first viewership count based the first set of viewership data, the first viewership count indicating total number of views of the first playback segment at the first time in Block S150.

This variation of the method S100 further includes, at a second time, receiving a second request from a second viewer population for a second playback segment of the video in the first rendition in Block S110, the second playback segment: defining a second playback interval following the first playback interval in the video; corresponding to a second mezzanine segment; including a first set of frames; and accessing a script configured to modify frames of rendition segments in Block S160. In addition, this variation of the method S100 includes, for each frame in the first set of frames: generating frame of a second rendition segment by transcoding a frame of the second mezzanine segment into the first rendition in Block S120; executing the script on the frame of the second rendition segment based on the first viewership count to generate a modified frame of a second modified rendition segment in Block S170; and transmitting the second modified rendition segment to the second viewer population in Block S130.

1.2 Second Variation

As shown in FIGS. 1-7, one variation of the method S100 includes, at a first time: receiving, from a first viewer population, a first request for a first playback segment of a video in Block S110; generating the first rendition segment corresponding to the first playback segment in Block S120; transmitting the first rendition segment to the first viewer population in Block S130; aggregating a first set of viewership data for the first playback segment in Block S140; and generating a first viewership count based the first set of viewership data, the first viewership count corresponding to a viewership data filter in Block S150.

In addition, this variation of the method S100 further includes, at the second time: receiving a second request from the second viewer population for a second playback segment of the video in Block S110; generating the second rendition segment corresponding to the first playback segment in Block S120; modifying frames of the second rendition segment to include the first viewership count in Block S170; and transmitting the second modified rendition segment to the second viewer population and the first viewership count in Block S130.

2. Applications

Generally, the method S100 is executed by a computer system (hereinafter "the system") in cooperation with one or more content distribution networks (hereinafter "CDNs") that are in communication with user devices (e.g., devices of an AV asset provider) and viewing devices (e.g., devices displaying the AV asset) in order to deliver accurate and concurrent viewership data to viewers and providers of an AV asset. More specifically, the system can: receive and aggregate beacon stream data from AV player instances; calculate concurrent views for each AV asset supported by the system; receive a request for viewership data via a CDN from a requesting device; and transmit viewership data to the requesting device via the CDN. Thus, by enabling the CDN to front API requests from requesting devices (such as viewing devices), the system can reduce the latency of the viewership data transmitted to the requesting devices and handle thousands or millions of requests for viewership data simultaneously, thereby enabling live displays of viewership data and/or the creation of accurate viewership data for AV asset providers. Additionally, by transferring the burden of calculating and recording viewership data from the AV asset provider to a third party, the system enables AV asset providers to implement an accurate viewership data request pipeline with an API call.

3. System

Figure 1:
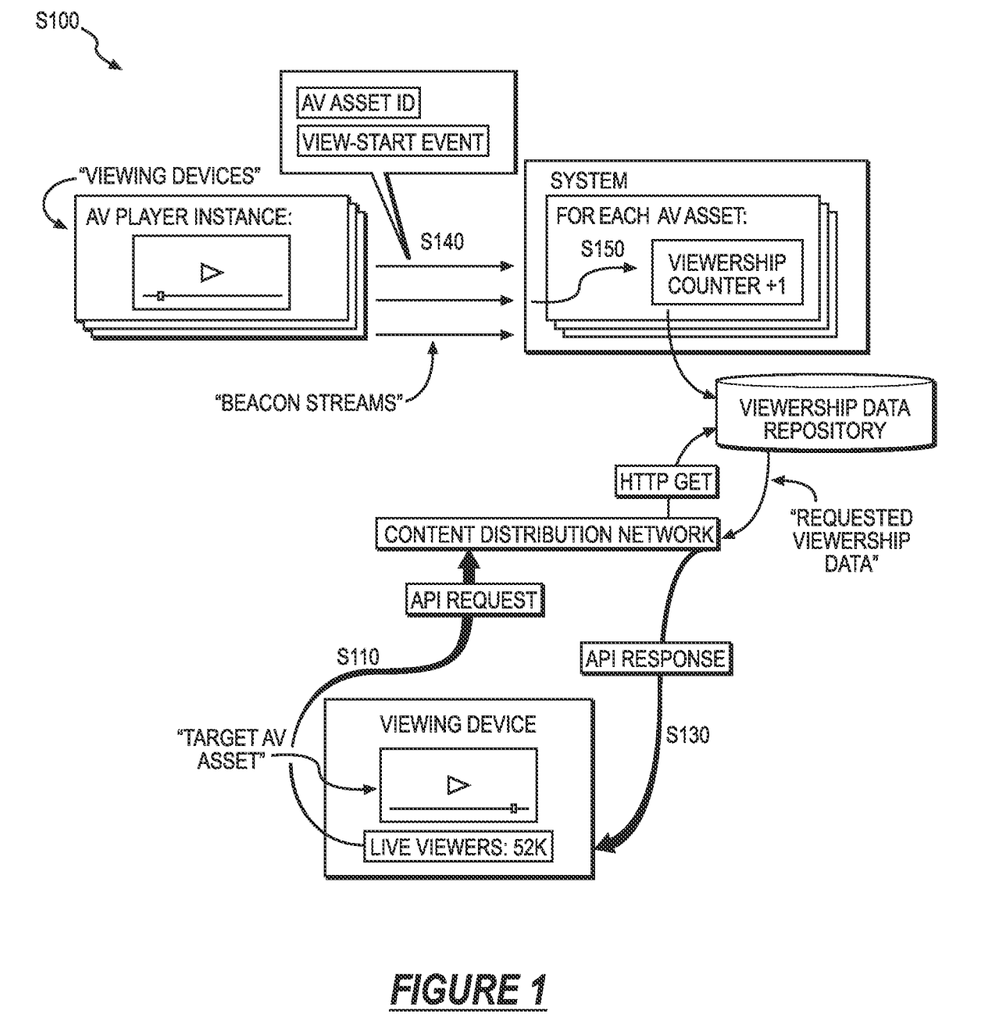
FIG. 1 is a flowchart representation of a method.
Figure 2:
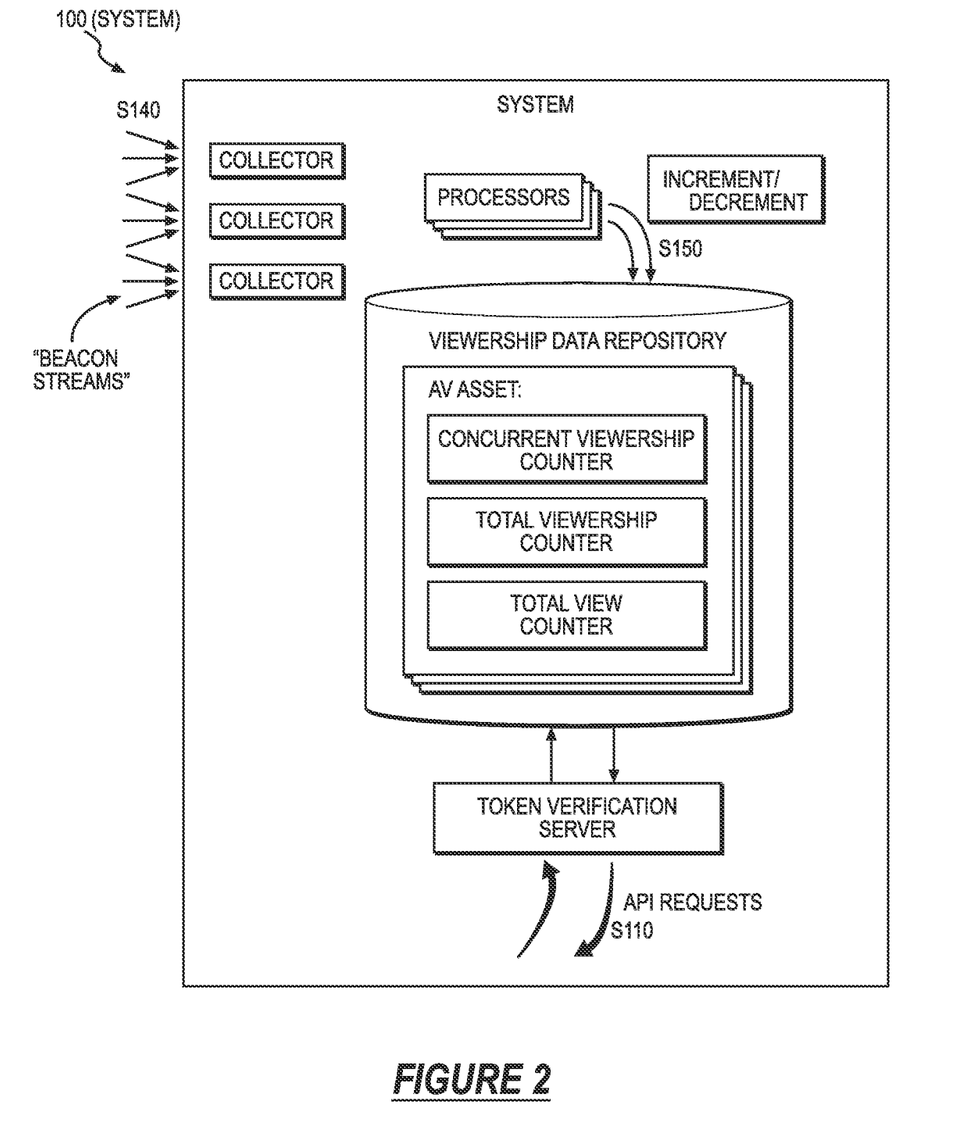
FIG. 2 is a schematic representation of a system.
Figure 3:
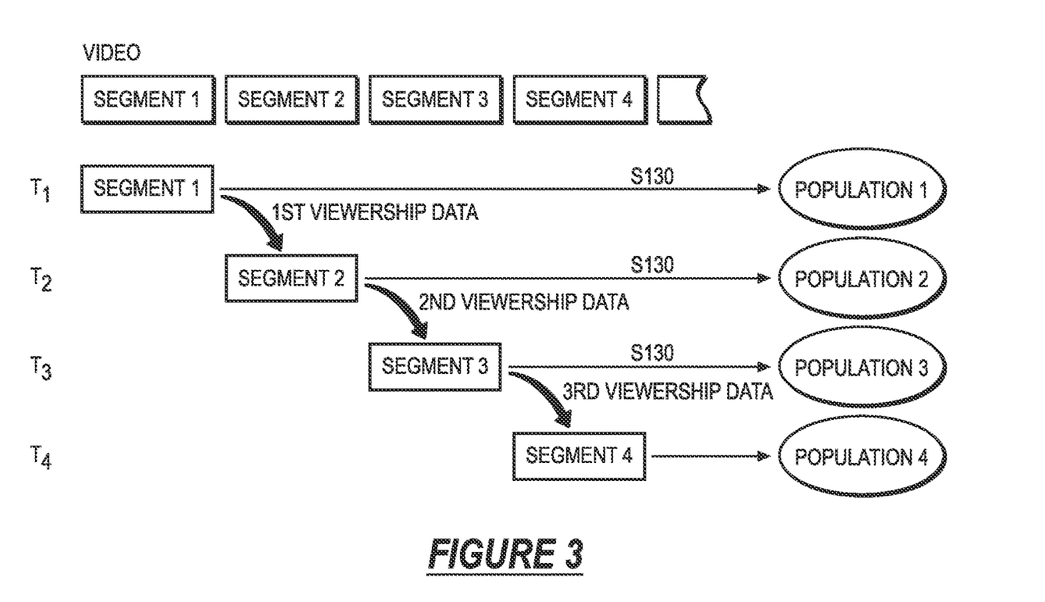
FIG. 3 is a schematic representation of one variation of a method.
Figure 4:
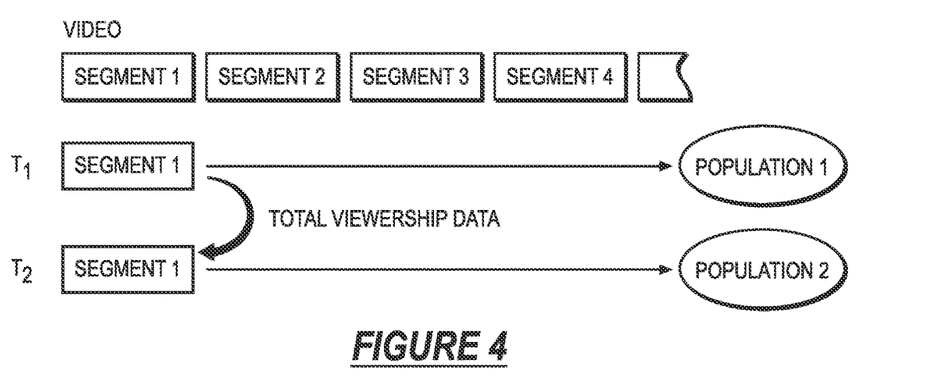
FIG. 4 is a schematic representation of one variation of a method.
Figure 5:
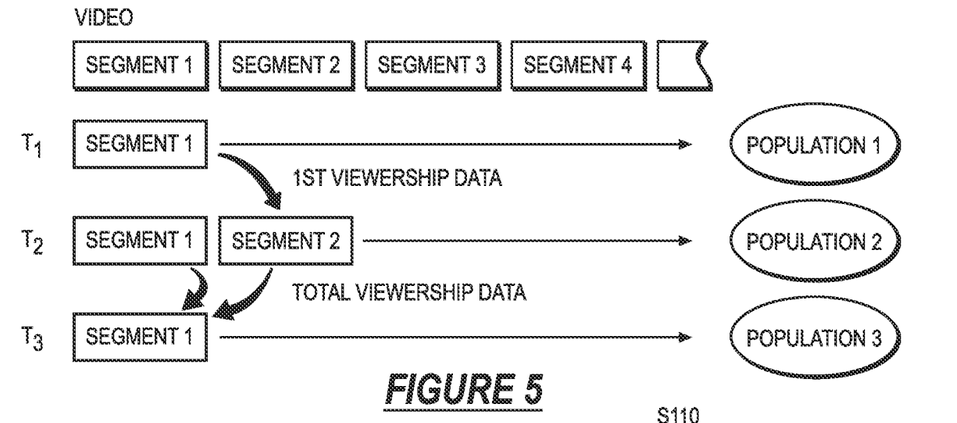
FIG. 5 is a schematic representation of one variation of a method.
Figure 6:
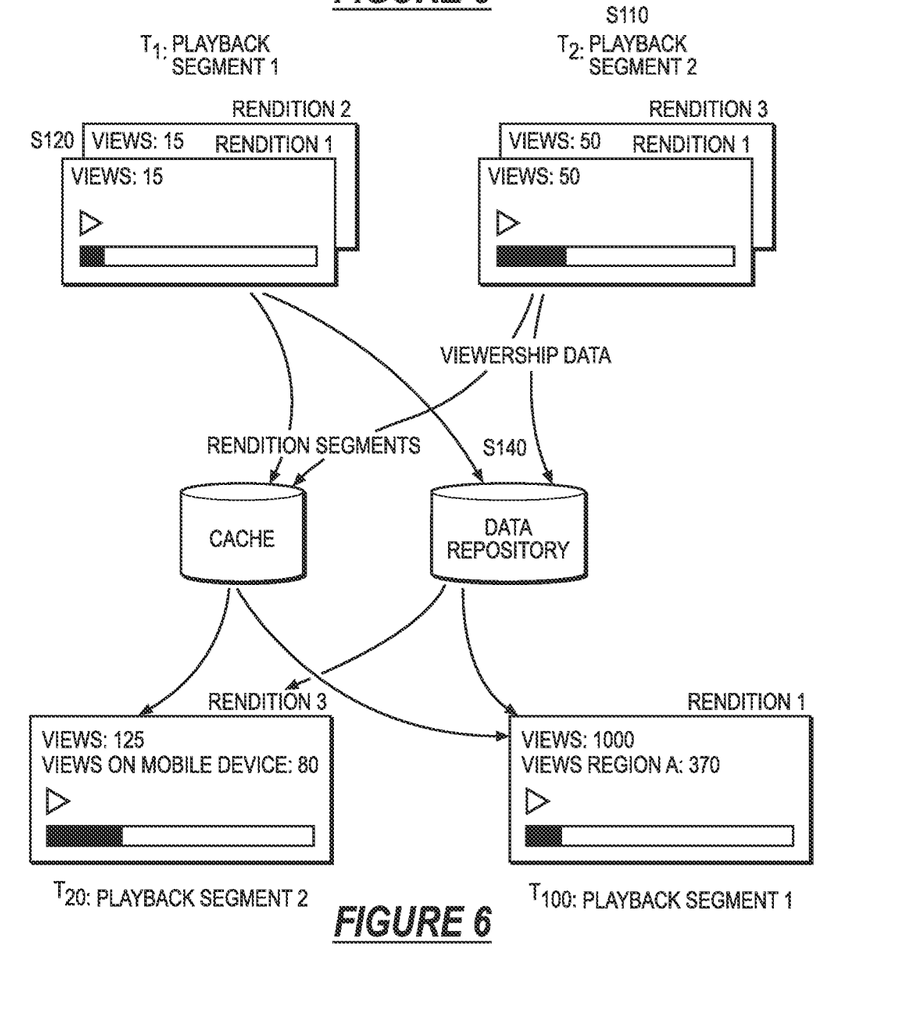
FIG. 6 is a schematic representation of one variation of a method.
Figure 7:
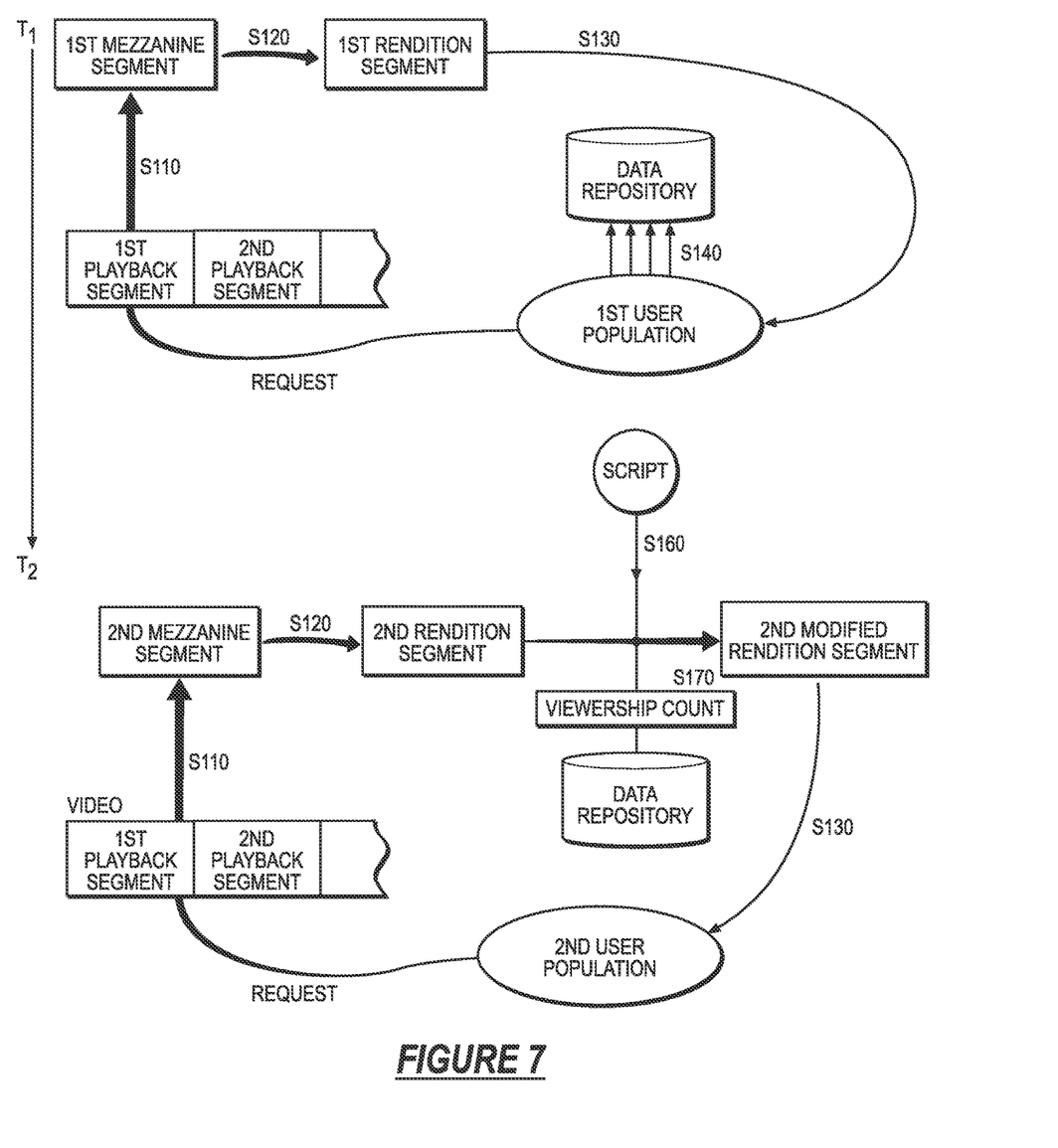
FIG. 7 is a schematic representation of one variation of a method.

Generally, as shown in FIG. 2, the system includes a server or set of servers and/or a set of data repositories configured to collect and distribute viewership data. More specifically, the system can include: a set of collectors (e.g., servers) configured to receive and process beacon streams from AV player instances; and a viewership data repository configured to respond to requests for viewership data from CDNs. In one implementation, the system can include a token verification server configured to verify security tokens associated with requests for viewership data.

3.1 Beacon Stream

Generally, the system can receive viewership data associated with an AV asset. To enable reception of viewership data by the system, an AV asset provider can install a beacon stream software development kit (hereinafter "SDK"), configured to interface with AV player instances rendering the AV asset and to transmit beacon streams to the system. Thus, when a viewer of the AV asset accesses a webpage hosting the AV asset via a corresponding viewing device, the viewing device executes an AV player instance and the beacon stream SDK to simultaneously play-back the AV asset for the viewer while reporting beacon stream data to the system.

Related U.S. patent application Ser. No. 17/465,356 describes the set of data that the system can receive via a beacon stream. For example, the system can receive beacon stream data, such as: view-start events, view-end events, pause events, seek events, and/or various playback error events (e.g., buffering events). Each event can be accompanied by a timestamp and/or a position within the AV asset at which the event occurred (e.g., an absolute timestamp—such as a UTC timestamp—and a relative timestamp within the AV asset). Additionally, the beacon stream can include metadata characterizing the AV asset being played-back at the AV player instance (e.g., an asset ID identifying the AV asset) in addition to metadata classifying the type of view (e.g., a location or region of the viewing device, a device category—such as mobile, laptop, desktop, large display, a resolution and/or bitrate characterizing the playback of the AV asset).

In one implementation, a view-start event indicates that the AV player instance has initiated playback of the AV asset, while a view-end event indicates that the AV player is no longer playing-back the AV asset (e.g., due to a user navigating away from the AV player instance, via pausing or closing the AV player instance).

3.2 Collector

Generally, the system includes a series of collectors configured to receive beacon streams from many (e.g., thousands or millions of) beacon stream SDKs and extract meaningful viewership data from these beacon streams. More specifically, the system can, via the set of collectors: receive a set of beacon streams; identify an AV asset ID for each beacon stream in the set of beacon streams; identify a subset of beacon streams associated with a target AV asset ID; increment a viewership counter corresponding to the target AV asset for each view-start event in the subset of beacon streams; decrement the viewership counter corresponding to the target AV asset for each view-end event in the subset of beacon streams; and transmit (e.g., push) a value of the viewership counter corresponding to the target AV asset to the data repository. Thus, the system includes a set of collectors configured to ingest beacon streams and generate or maintain viewership data based on these beacon streams. This process is described in further detail below.

In one implementation, the system can aggregate a first set of viewership data for the first playback segment at a first time by: receiving a first set of beacon streams from the first viewer population, each beacon stream in the first set of beacon streams including a first set of beacon stream data and a first set of metadata; and transmitting the first set of beacon stream data and the first set of metadata to the data repository. Therefore, the system includes a set of collectors configured to receive beacon streams associated with the first playback segment from a first viewer population at the first time.

In one implementation, the system can aggregate a second set of viewership data for the first playback segment at a second time by: receiving a second set of beacon streams from the second viewer population, each beacon stream in the second set of beacon streams including a second set of beacon stream data and a second set of metadata; and transmitting the second set of beacon stream data and the second set of metadata to the data repository. Therefore, the system includes a set of collectors configured to receive beacon streams associated with the second playback segment from a second viewer population at the second time.

3.3 Data Repository

Generally, the system can push aggregated viewership data to a data repository from which the system can make the viewership data available to a requesting CDN. More specifically, the system can maintain a data repository that segregates or buckets the data based on several data or metadata filters that can include: AV asset ID; viewing device location; and view device type. Thus, the system can update values of viewership data stored in the data repository in order to deliver these viewership data to requesting CDNs.

4. Content Distribution Network

Generally, the system interfaces with a set of CDNs configured to receive API requests from viewing devices and query the requested viewership data from the system. More specifically, the set of CDNs are configured to front the API (as opposed to the system fronting the API directly), thereby enabling lower latency for delivery of viewership data to a viewing device (or any other requesting device). Thus, the system can flexibly deliver viewership data via a set of CDNs in communication with requesting devices (e.g., viewing devices). In one implementation, a CDN in the set of CDNs may deliver both viewership data and AV data for display or playback respectively at a viewing device.

5. AV Asset Provider

Generally, the system can cooperate with a provider of an AV asset to deliver viewership data to viewers of the AV asset. More specifically, the AV asset provider can include specialized API calls to request viewership data from the system within a webpage hosting the AV asset. Therefore, upon a viewer requesting the AV asset via the webpage, the viewer may also initiate an API call requesting viewership data for the AV asset. Thus, an AV asset provider can avoid fronting requests for viewership data from viewing devices and can instead utilize the API to make the request directly to the CDN. This mechanism reduces system complexity and load handling requirements on the AV asset provider.

6. Viewer and Viewing Device

Generally, the system receives requests for viewership data from viewing devices on behalf of a viewer such that the viewing device can render a representation of current viewers of an AV asset alongside the AV asset itself. More specifically, the viewing device can execute an API call requesting viewership data via a webpage or application hosting an AV asset. For example, a viewing device can playback a livestream to a viewer while also rendering a count of the number of concurrent viewers of the livestream. In another example, a viewing device can playback a stored AV asset and can simultaneously render a total viewership count for the stored AV asset. Thus, the system can respond to requests for viewership data from viewing devices via a CDN in the set of CDNs.

7. Viewership Data Delivery

Generally, the system can deliver viewership data requested via an API call made by a requesting device (e.g., a viewing device) to a CDN fronting the API on behalf of the system. In response to receiving the API call, the CDN can forward a request for viewership data to the system, which can approve or deny this request based on a security token included with the request for viewership data. Additionally, the system can process a set of beacon streams from multiple AV player instances in order to generate accurate viewership data for each AV asset supported by the system. Each of these Blocks of the method S100 is described in further detail below.

7.1 Beacon Stream Reception and Processing

Generally, the system can curate a viewership counter for each supported AV asset by receiving a set of beacon streams from a set of video player instances, each beacon stream in the set of beacon streams including an AV asset ID. More specifically, upon receiving a beacon stream generated by an SDK associated with an AV player, the system can parse the beacon stream to identify the AV asset ID associated with the beacon stream, thereby enabling the system to segregate viewership data from multiple AV assets that may be viewed simultaneously. Additionally, the system can filter viewership data based on any other metadata included in the beacon stream.

In one implementation, the system can receive a beacon stream including: an AV asset ID (identifying the AV asset being viewed at the AV player instance); a unique view ID (generated by the SDK in order to track the view duration and interval within the AV asset); a viewer ID (generated by the SDK in order to track a single viewer over multiple views of the same AV asset and/or multiple AV assets, such as via a browser cookie); a viewing region (e.g., a geographic location associated with the view); a viewing device type or category; and/or a viewing rendition (e.g., representing the bandwidth and resolution at which the AV asset is being viewed). Thus, by receiving beacon streams labeled with metadata, the system can apply filters to the viewership data in order to provide additional insight or engagement to viewers or providers of the AV asset.

In another implementation, the system can receive beacon streams including a view-start event, a view-end event, a pause event, and a seek event. In another implementation, the system can receive beacon streams including playback error events indicating buffering or other playback difficulties encountered by the AV player instance during playback of the AV asset.

Upon receiving a set of concurrent beacon streams, the system can identify a subset of beacon streams in the set of beacon streams characterized by a target asset ID corresponding to a target AV asset. More specifically, the system can simultaneously identify a subset of beacon streams corresponding to each AV asset in a set of supported AV assets based on the AV asset ID associated with each beacon stream.

Upon identifying a subset of beacon streams corresponding to an AV asset ID, the system can initiate viewership counts for the AV asset. More specifically, the system can initiate a concurrent viewership count representing a number of viewers actively viewing the AV asset and a total viewership count representing the total number of unique viewers that have viewed the AV asset. In one implementation, the system can generate additional viewership counters representing a number of viewers associated with various metadata labels, such as a number of viewers from a particular region, a number of viewers viewing the AV asset from a particular viewing device type, and/or a number of viewers viewing the AV asset at a particular rendition.

7.2 Viewership Counter

Generally, the system can initialize a concurrent viewership counter upon receiving a first beacon stream characterized by an AV asset ID that includes a view-start event or upon creation of an AV asset supported by the system. The system can subsequently continue to increment the concurrent viewership counter in response to receiving a view-start event in a beacon stream in the subset of beacon streams characterized by the AV asset ID. Additionally, the system can decrement the concurrent viewership counter in response to receiving a view-end event in a beacon stream in the subset of beacons streams characterized by the AV asset ID. Thus, the system can track the number of concurrent viewers of a particular AV asset. In one implementation, the system can decrement the concurrent viewership counter in response to inferring a view-end event from an incomplete a beacon stream (e.g., beacon stream where certain beacons are missing) or from data received from the CDN.

In one implementation, the system can initiate a total viewership counter upon receiving a first beacon stream characterized by an AV asset ID that includes a view-start event or upon creation of an AV asset supported by the system. In this implementation, the system continues to increment the total viewership counter associated with an AV asset ID in response to each view-start event received in the subset of beacon streams characterized by the AV asset ID and characterized by a unique viewer ID. Thus, the system can maintain a viewership counter representing the total number of unique views of the AV asset.

In another implementation, the system can maintain separate viewership counters (e.g., concurrent or total) for each combination of filters for which the system enables viewership querying. In this implementation, the system can increment multiple viewership counters associated with filters satisfied by the metadata of the beacon stream from which the system receives a view-start event. For example, in response to receiving a beacon stream labeled with metadata indicating a viewing device region, a viewing device type, and a viewing rendition and including a view-start event, the system can increment viewership counters associated with the viewing device region, the viewing device type, and the viewing rendition indicated by the metadata of the beacon stream. Likewise, the system can decrement these viewership counters in response to receiving a view-end event in the beacon stream.

In one implementation, the system can generate the first viewership count (e.g., counter) based on the first set of viewership data by: initiating the first viewership count (e.g., an integer); incrementing the first viewership count based on each view-start event in the first set of beacon stream; decrementing the first viewership count based on each view-end event in the first set of beacon streams; and transmitting the first viewership count to the data repository. In addition, the system can generate the second viewership count based on the second set of viewership data by: incrementing the second viewership count based on each view-start event in the second set of beacon streams; decrementing the second viewership count based on each view-end event in the second set of beacon streams; and transmitting the second viewership count to the data repository. Therefore, the system can generate a viewership counter for each segment of a video that is being livestreamed. In particular, the system can generate a viewership count (e.g., counter) based on the beacon streams received from the population of viewers that watching a particular segment.

Generally, the system can periodically (e.g., upon initializing a viewership counter, upon updating a viewership counter, and/or on a predetermined reporting interval) push the value of each viewership counter associated with an AV asset ID to a data repository capable of responding to requests for viewership data from CDNs (e.g., in the form of an HTTP get request). Thus, by consistently updating the values of each viewership counter in the data repository, the system can make updated viewership data available to viewers of the AV asset and the provider of the AV asset.

7.3 User Token Generation

In one implementation, the system secures requests for viewership data using signed URLs for viewership data requests. In this implementation, the system can issue a private key with which AV asset providers can signs URLs corresponding to viewership data requests for inclusion in a webpage or application playing the AV asset. The AV asset provider can then include this signed URL in the webpage or application code in order to enable the viewing device of the AV asset to request viewership data directly from the system via a CDN. In this implementation, upon receiving a signed viewership data request from a viewing device, a CDN can forward the signature associated with the viewership data request to the system for verification. The system can then transmit an indication of the validity of the signature to the CDN. In response to verification of a signature, the CDN can cache the signature to minimize the number of requests for verification that must be submitted to the system. Thus, upon verifying a signature, the CDN can immediately issue viewership data to requesting viewing devices upon matching a signature with a previously received and verified signature within the CDNs cache.

In one implementation, the system can revoke keys after a predetermined time period or upon completing broadcast of a live AV asset. Upon revoking a key, the system can command the set of CDNs fronting the API to purge the key from their caches or the system can simply wait for the keys to expire within the cache of each CDN.

7.4 Request Generation and Handling

Generally, the system receives requests for viewership data from a requesting device (e.g., a viewing device or a provider device) via a CDN based on an API request transmitted by the requesting device and received by the CDN. More specifically, the CDN can verify the API request received from the requesting device and query the system for requested viewership data. Thus, the system can transmit viewership data directly to CDNs, which are configured to distribute the viewership data to requesting devices.

In one example, the system receives a request for viewership data from a viewing device (e.g., the viewing device is the requesting device). More specifically, the system can receive a request for viewership data for the target AV asset via a content distribution network from a viewing device viewing the target AV asset. In this example, the system receives an HTTP GET request upon verification by the CDN of the API request received from the receiving device. The system then fulfills the HTTP GET request and transmits the requested values of viewership counters from the viewership data repository to the CDN, the CDN then forwards these viewership data to the viewing device. In this example, the viewing device can then render the requested viewership counts alongside the AV player instance playing-back the associated AV asset.

In another example, the system receives a request for viewership data from an AV asset provider device (e.g., the AV asset provider is the requesting device). More specifically, the system can receive a request for viewership data for the target AV asset via a CDN from an AV asset provider device associated with the target AV asset. In this example, the system also receives an HTTP GET request upon verification by the CDN of the API request received from the receiving device. The system then fulfills the HTTP GET request and transmits the requested values of viewership counters from the viewership data repository to the CDN, and the CDN then forwards these viewership data to the AV asset provider device. In this example, the AV asset provider can render a dashboard tracking viewership data for multiple categories of viewers, thereby enabling the AV asset provider to track these viewers in real time during broadcast of a live AV asset or at any time while the AV asset is available for streaming.

In one implementation, the system can receive and respond to a request for a specific viewership counter associated with the AV asset representing filtered viewership data. In this implementation, the system receives an HTTP GET request from a CDN based on a URL representing the API request. Thus, the URL representing the API request can indicate to the CDN the requested viewership counters.

In another implementation, the system can distribute private keys to AV asset providers with which the AV asset provider can sign URLs representing API requests to the CDN. In this implementation, the system can receive an HTTP request from a CDN to verify a signature received via an API request from a requesting device. The system can then either approve or deny the signature. If the system approves the signed URL, the CDN can cache the signature and immediately validate future requests including the signed URL. Thus, the system and the CDN can cooperate to prevent unnecessary URL verification requests to the system.

7.5 Data Delivery

Generally, upon receiving a request for viewership data from a CDN corresponding to an API request, the system can: retrieve a value of the viewership counter associated with the requested viewership data at the time of the request; and transmit the value of the viewership counter to a viewing device via the CDN for rendering at the viewing device. More specifically, the system can: update a viewership counter associated with a target AV asset; and, in response to receiving a request for a requested viewership counter at a first time from a requesting device via a CDN, transmit a value of the requested viewership counter at the first time to the CDN for distribution to the requesting device. Thus, the system can interface with the CDN to report low latency viewership data to requesting devices.

In one implementation, the CDN can cache values of viewership counters for a predetermined expiration interval (e.g., five seconds, ten seconds, one minute). Therefore, if the CDN receives a request for viewership data that is already cached at the CDN, then the CDN can respond to the request for viewership data directly instead of transmitting a repetitive HTTP GET request to the system. Thus, the predetermined expiration interval for viewership data at the CDN reduces the frequency of requests to the system from the CDN to a minimum frequency corresponding to (i.e., inversely proportional to) the expiration interval.

8. Viewership Rendering

Generally, upon receiving viewership data such as a number of concurrent viewers of the target AV asset, a number of total viewers of the target AV asset, a number of total views of the target AV content, or versions of these viewership counts filtered according to viewing region, viewing device, viewing rendition, or any other characteristic, the requesting device can render the viewership data in association with the AV asset or in a dashboard characterizing views of an AV asset. More specifically, the system can transmit the value of a requested viewership counter to a requesting device for rendering by the requesting device. Thus, the system enables accurate and low-latency viewership counters to be displayed at the requesting device.

In one example, the system can transmit the requested value of a concurrent viewership counter associated with the target AV asset to a viewing device rendering the target AV asset. In this example, the viewing device can render the value of the viewership counter received from the system proximal to the AV player instance displayed by a webpage, web application, or native application executing on the viewing device.

In another example, the system can transmit a requested value of a concurrent viewership counter, a total viewership counter, a total views counter, as well as regional concurrent viewership counters, regional total viewership counters, and regional total views counters (all associated with a target AV asset) to an AV asset provider device. In this example, the AV asset provider device can render a dashboard or other user interface including each of the above viewership or view counters, thereby presenting a complete representation of viewership of the AV asset to a provider of the AV asset.

In one implementation, the system can implement methods and techniques described in U.S. patent application Ser. No. 15/875,796 to capture of information relating to video playback in real-time data on video playback platforms.

In one implementation, the system can implement methods and techniques described in U.S. patent application Ser. No. 16/458,630 to generate rendition segments for live video in real time to deliver the video to the populations of viewers requesting the video.

In one implementation, the system can implement methods and techniques described in U.S. patent application Ser. No. 17/031,536 to write viewership values to the rendition segments to deliver the viewership data to the requesting populations.

9. Providing Viewership Data in Segments of a Live Video

In one implementation, the system can, at the second time: aggregate a second set of viewership data for the second playback segment; and generate a second viewership count based on the second set of viewership data, the second viewership count indicating total number of views of the second playback segment at the second time. In addition, the system can, at a third time: receive a third request for a third playback segment in the first rendition from a third viewer population, the third playback segment corresponding to a third mezzanine segment and including a second set of frames. For each frame in the second set of frames, the system can: generate a frame of a third rendition segment by transcoding a frame of the third mezzanine segment into the first rendition; and execute the script on the frame of the third rendition segment based on the second viewership count to generate a modified frame of a third modified rendition segment. Once the third modified rendition segment is generated, the system can transmit the third modified rendition segment to the third viewer population. Therefore, the system can provide, for the first time, a second rendition segment to a third viewer population after providing the first rendition segment to the first viewer population at a first time, and provide, as part of the second rendition segment, viewership data collected for the first rendition segment. For example, the system can transmit, to the third viewer population, the number of viewers who watched the first rendition segment as part of the second rendition segment.

10. Presenting Viewership Data in Segments a Stored Video

In one implementation, the system can store the first rendition segment at the first time. Therefore, upon receiving a request for the first rendition segment at a later time, the system can access the stored first rendition segment (e.g., without generating the first rendition segment again). At the second time, the system can: receive, from a third viewer population, a third request for the first playback segment of the video in a first rendition; access the first rendition segment, the first rendition segment including a third set of frames; and generate a total viewership count based the first set of viewership data, the total viewership count indicating total number of views of the video. Therefore, upon receiving a request for the first rendition regiment for the second time, the system can access the first rendition segment stored in the cache and start counting cumulative views for the video instead of counting views that the first rendition segment received at a certain time. For each frame in the third set of frames, the system can: execute the script on the frame of the first rendition segment based on the total viewership count to generate a modified frame of the second modified rendition segment; and transmit the first modified rendition segment to the third viewer population. In addition, the system can update the first set of viewership data for the first playback segment by: aggregating a third set of viewership data for the first rendition segment at the second time, the third set of viewership data indicating total number of views of the first playback segment at the second; and transmitting the third set of viewership data to the data repository. Therefore, the system can modify each frame of the requested rendition segment to include the current viewership count for the video and transmit the modified rendition segment to the requesting population. Generally, the system can provide the first segment to a second population after providing the first segment to a first population and display, as part of the first segment, total viewership data collected from the first population.

In one implementation, the system can: at the second time, store the second rendition segment in the cache; at the third time receive, from a fourth viewer population, a fourth request for the second playback segment of the video in a first rendition; access the second rendition segment, the second rendition segment including the first set of frames; and generate a total viewership count based on the first set of viewership data and the second set of viewership data, the total viewership count indicating total number of views of the video and comprising a sum of views of the video by the first viewer population and the second viewer population. For each frame in the first set of frames, the system can: execute the script on the frame of the second rendition segment based on the total viewership count to generate a modified frame of a second modified rendition segment. Then, the system can: transmit the second modified rendition segment to the fourth viewer population; and update the second set of viewership data for the second playback segment by aggregating a fourth set of viewership data indicating total number of views of the second playback segment at the third time and transmitting the fourth set of viewership data to the data repository. Therefore, the system can present a stored second rendition segment to the third population after providing the second segment to a second population at an earlier time. When presenting the second rendition segment for the first time (e.g., at a second time), the system can modify the frames of the second rendition segment to include the number of views that the video received at the first time. When presenting the second rendition segment for the second time (e.g., at a third time), the system can modify the frames of the second rendition segment to include the number of views that the video received up to the third time (e.g., at a first time and at the second time). In order to include the number of views that the video received up to the third time in the frames of the second rendition segment, the system can generate a total viewership count based on the first set of viewership data and the second set of viewership data and update the first set of viewership data to reflect the views from the fourth viewer population after providing the second rendition segment.

In one implementation, at the second time, the system can store the second rendition segment in the cache. At the third time, the system can: receive, from a fourth viewer population, a fourth request for the second playback segment of the video in the first rendition; access the second rendition segment, the second rendition segment including the first set of frames; and calculate a first viewership count increase as a percent increase in the number of views from the first time to the second time. Then, in response to the first viewership count increase exceeding a threshold increase, the system can, for each frame in the first set of frames: execute the script on the frame of the second rendition segment based on the second viewership count in order to generate a modified frame of a second modified rendition segment; and transmit the modified second rendition segment to the fourth viewer population. Therefore, the system can modify the frames of a rendition segment to include viewership data in response to a viewership increase at the previous time exceeding a threshold.

In one implementation, at the second time, the system can store the second rendition segment in the cache, and at the third time: receive, from a fourth viewer population, a fourth request for the second playback segment of the video in the first rendition; access the second rendition segment, the second rendition segment including the first set of frames; and calculate a first viewership count increase as a percent increase in the number of views from the first time to the second time. Then, in response to the first viewership count increase falling below a threshold increase, the system can transmit the second rendition segment to the fourth viewer population. Therefore, in response to a viewership increase at the previous time falling below a threshold, the system can transmit the second rendition segment without modifying the frames of a rendition segment to include viewership data.

11. Presenting Various Types of Viewership Data

In one implementation, at the third time, the system can: receive, from a fourth viewer population, a fourth request for the first playback segment of the video in the first rendition; access the first rendition segment, the first rendition segment including a third set of frames; and update a total viewership count based on the updated first set of viewership data to include a sum of views of the video by the first viewer population, the second viewer population, and the fourth viewer population. For each frame in the third set of frames, the system can execute the script on the frame of the first rendition segment based on the total viewership count to generate a modified frame of a first modified rendition segment. Then, the system can transmit the first modified rendition segment to the fourth viewer population and update the first set of viewership data for the first playback segment by: aggregating the third set of viewership data indicating total number of views of the first playback segment at the third time; and transmitting the third set of viewership data to the data repository. Therefore, the system can, receive a request for the first rendition segment for the third time and present the first rendition segment to the requesting population (e.g., fourth viewer population) at the third time. When presenting the first rendition segment at the third time, the system can modify the frames of the first rendition segment to include the number of views that the video received up to the third time by updating the total viewership count to include views of the video generated by the populations (e.g., first viewer population, second viewer population, third viewer population) that requested the video at prior times (e.g., first time, second time). The system can also update the viewership data such that the system can update the total viewership count based on the updated viewership data in response to receiving a request for a rendition segment of the video at a subsequent time.

In one implementation, the system can: at the second time, store the second rendition segment in the cache; and, at the third time receive, from a fourth viewer population, a fourth request for the second playback segment of the video in the first rendition and access the second rendition segment. For each frame in the first set of frames, the system can execute the script on the frame of the second rendition segment based on the second viewership count to generate a modified frame of a second modified rendition segment. In addition, the system can: transmit the second modified rendition segment to the fourth viewer population; and update the second viewership count, the second viewership count indicating total number of views of the second playback segment and including a sum of views by the second viewer population and the fourth viewer population. Therefore, in response to presenting a stored rendition segment of the video for a second time, the system can present the rendition segment with cumulative viewership data for this rendition segment. In particular, the system can modify the frames of the second rendition segment at a third time to include the number of views that the second rendition segment received at the first time and at the second time.

In one implementation, the system can, during the first time, generate a first unique viewership count based on first set of viewership data by: initiating the first unique viewership count indicating number of unique viewers in the first viewer population; incrementing the unique viewership count in response to at least one view start event associated with a unique viewer ID in first set of viewership data; and decrementing the viewership count in response to at least one view-end event associated with a unique viewer ID in the first set of viewership data. In addition, at a second time, the system can execute the script on the frame of the second rendition segment based on the first viewership count to generate a modified frame of the second modified rendition segment by: executing the script on the frame of the second rendition segment based on the first viewership count and based on the first unique viewership count to generate a modified frame of the second modified rendition segment. Moreover, the system can execute the script on the frame of the second rendition segment based on the first viewership count and the first unique viewership count to generate a modified frame of the second modified rendition segment by: accessing values of the first viewership count and the first unique viewership count; and modifying the frame to include the values of the first viewership count and the first unique viewership count. Therefore, when presenting a rendition segment for the first time, the system can present the rendition segment with a unique viewership count for the previous segment. In particular, the system can modify the frames of the second rendition segment at a second time to include the number of views by a unique viewer that the first rendition segment received at the first time.

12. Presenting Viewership Data in Various Renditions of the Video

In one implementation, the system can, at a first time: receive, from a third viewer population, a third request for a first playback segment of the video in a second rendition; generate a third rendition segment in the second rendition by transcoding the first mezzanine segment into the second rendition, the third rendition segment corresponding to the first playback segment of the video in the second rendition; and transmit the third rendition segment to the third viewer population. Therefore, the system can distribute playback segments of the video in more than one rendition. When more than one rendition of the same playback segment is requested, the system can aggregate a first set of viewership data for the first playback segment by: aggregating viewership data for the first rendition segment and the third rendition segment; and transmitting the first set of viewership data for the first rendition segment and the third rendition segment to the data repository. Similarly, when more than one rendition of the same playback segment is requested, the system can generate the first viewership count based the first set of viewership data, the first viewership count indicating total number of views of the first playback segment at the first time by: generating the first viewership count for the first rendition segment; generating a second viewership count for the third rendition segment; and transmitting, to the data repository, the first viewership count including a sum of the first viewership count and the second viewership count. Therefore, the system can account for views of all renditions of the playback segment when aggregating viewership data and generating viewership count.

13. Storing Viewership Data with the Rendition Segment as Metadata Tag

In one implementation, the system can: at the first time, store the first rendition segment in a cache with a metadata tag, the metadata tag including the first viewership count; at the second time, receive from a third viewer population, a third request for the first playback segment of the video in the first rendition; and access the first rendition segment, the first rendition segment including a third set of frames. For each frame in the third set of frames, the system can execute the script on the frame of the first rendition segment based on the first viewership count to generate a modified frame of a first modified rendition segment. Then, the system can: transmit the first modified rendition segment to the third viewer population; update the first set of viewership data for the first playback segment by aggregating third set of viewership data for the first rendition segment at the second time and transmitting the third set of viewership data to the data repository; generate a unique viewership count based on the first set of viewership data, the unique viewership count indicating total number of unique viewers of the video; and modify the metadata tag to include the unique viewership count. Therefore, the system can not only store the rendition segment for later retrieval and distribution, but also store the viewership data (e.g., first viewership count) along the rendition segment.

In one implementation, at the third time, the system can: receive, from a fourth viewer population, a fourth request for the first playback segment of the video in the first rendition; and access the first modified rendition segment and the metadata tag. For each frame in the third set of frames, the system can: execute the script on the frame of the first rendition segment based on the metadata tag to generate a modified frame of the first modified rendition segment. Then, the system can transmit the first modified rendition segment to the fourth viewer population. Moreover, the system can execute the script on the frame of the first rendition segment based on the metadata tag to generate a modified frame of the first modified rendition segment by: accessing a value of unique viewership count; and modifying the frame to include the unique viewership count. Therefore, the system can, upon receiving a request for a rendition segment of the video, access the rendition segment and the information stored in the metadata tag and deliver the rendition segment and the information stored in the metadata gat to the requesting population.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a first time:
   receiving, from a first viewer population, a first request for a first playback segment of a video in a first rendition, the first playback segment:
   defining a first playback interval in the video; and
   corresponding to a first mezzanine segment in a first mezzanine encoding;
   generating a first rendition segment by transcoding the first mezzanine segment into the first rendition segment in the first rendition;
   transmitting the first rendition segment to the first viewer population;
   aggregating a first set of viewership data for the first playback segment; and
   generating a first viewership count based the first set of viewership data, the first viewership count indicating total number of views of the first playback segment at the first time; and
   at a second time:
   receiving a second request from a second viewer population for a second playback segment of the video in the first rendition, the second playback segment:
   defining a second playback interval following the first playback interval in the video;
   corresponding to a second mezzanine segment; and
   comprising a first set of frames;
   accessing a script configured to modify frames of rendition segments;
   for each frame in the first set of frames:
   generating a frame of a second rendition segment by transcoding a frame of the second mezzanine segment into the first rendition; and
   executing the script on the frame of the second rendition segment based on the first viewership count to generate a modified frame of a second modified rendition segment; and
   transmitting the second modified rendition segment to the second viewer population.

2. The method of claim 1, further comprising:
   at the second time:
   aggregating a second set of viewership data for the second playback segment; and
   generating a second viewership count based on the second set of viewership data, the second viewership count indicating total number of views of the second playback segment at the second time; and
   at a third time:
   receiving a third request for a third playback segment in the first rendition from a third viewer population, the third playback segment:
   corresponding to a third mezzanine segment; and
   comprising a second set of frames;
   for each frame in the second set of frames:
   generating a frame of a third rendition segment by transcoding a frame of the third mezzanine segment into the first rendition; and
   executing the script on the frame of the third rendition segment based on the second viewership count to generate a modified frame of a third modified rendition segment; and
   transmitting the third modified rendition segment to the third viewer population.

3. The method of claim 2:
   wherein aggregating the first set of viewership data for the first playback segment comprises:
   receiving a first set of beacon streams from the first viewer population, each beacon stream in the first set of beacon streams comprising a first set of beacon stream data and a first set of metadata; and
   transmitting the first set of beacon stream data and the first set of metadata to a data repository;
   generating the first viewership count based on the first set of viewership data comprises:
   initiating the first viewership count, the first viewership count represented by an integer;
   incrementing the first viewership count based on each view-start event in the first set of beacon stream;
   decrementing the first viewership count based on each view-end events in the first set of beacon streams; and
   transmitting the first viewership count to the data repository;
   wherein aggregating the second set of viewership data for the second playback segment comprises:
   receiving a second set of beacon streams from the second viewer population, each beacon stream in the second set of beacon streams comprising a second set of beacon stream data and a second set of metadata; and
   transmitting the second set of beacon stream data and the second set of metadata to the data repository; and
   wherein generating the second viewership count based on second set of viewership data comprises:
   incrementing the second viewership count based on each view-start events in the second set of beacon streams;
   decrementing the second viewership count based on each view-end events in the second set of beacon streams; and
   transmitting the second viewership count to the data repository.

4. The method of claim 2, further comprising:
   at the second time:
   storing the second rendition segment in a cache; and
   at the third time:
   receiving, from a fourth viewer population, a fourth request for the second playback segment of the video in the first rendition;
   accessing the second rendition segment, the second rendition segment comprising the first set of frames;
   generating a total viewership count based on the first set of viewership data and the second set of viewership data, the total viewership count:
   indicating total number of views of the video; and
   comprising a sum of views of the video by the first viewer population and the second viewer population;
   for each frame in the first set of frames:
   executing the script on the frame of the second rendition segment based on the total viewership count to generate a modified frame of second modified rendition segment;
   transmitting the second modified rendition segment to the fourth viewer population; and updating the second set of viewership data for the second playback segment, comprising:
aggregating a fourth set of viewership data indicating total number of views of the second playback segment at the third time; and
transmitting the fourth set of viewership data to a data repository.

5. The method of claim 2, further comprising:
at the second time:
storing the second rendition segment in a cache; and
at the third time:
receiving, from a fourth viewer population, a fourth request for the second playback segment of the video in the first rendition;
accessing the second rendition segment, the second rendition segment comprising the first set of frames;
for each frame in the first set of frames:
executing the script on the frame of the second rendition segment based on the second viewership count, to generate a modified frame of a second modified rendition segment;
transmitting the second modified rendition segment to the fourth viewer population; and
updating the second viewership count, the second viewership count:
indicating total number of views of the second playback segment; and
comprising a sum of views by the second viewer population and the fourth viewer population.

6. The method of claim 2, further comprising:
at the second time:
storing the second rendition segment in a cache; and
at the third time:
receiving, from a fourth viewer population, a fourth request for the second playback segment of the video in the first rendition;
accessing the second rendition segment, the second rendition segment comprising the first set of frames;
calculating a first viewership count increase comprising a percent increase in the number of views from the first time to the second time;
in response to the first viewership count increase exceeding a threshold increase, for each frame in the first set of frames:
executing the script on the frame of the second rendition segment based on the second viewership count, to generate a modified frame of a second modified rendition segment; and
transmitting the modified second rendition segment to the fourth viewer population.

7. The method of claim 2, further comprising:
at the second time:
storing the second rendition segment in a cache; and
at the third time:
receiving, from a fourth viewer population, a fourth request for the second playback segment of the video in the first rendition;
accessing the second rendition segment, the second rendition segment comprising the first set of frames;
calculating a first viewership count increase a percent increase in the number of views from the first time to the second time; and
in response to the first viewership count increase falling below a threshold increase, transmitting the second rendition segment to the fourth viewer population.

8. The method of claim 1:
further comprising, at the first time:
receiving, from a third viewer population, a third request for a first playback segment of the video in a second rendition;
generating a third rendition segment in the second rendition by transcoding the first mezzanine segment into the second rendition, the third rendition segment corresponding to the first playback segment of the video in the second rendition; and
transmitting the third rendition segment to the third viewer population;
wherein aggregating the first set of viewership data for the first playback segment comprises:
aggregating the first set of viewership data for the first rendition segment and the third rendition segment; and
transmitting to a data repository the first set of viewership data for the first rendition segment and the third rendition segment; and
wherein generating the first viewership count based the first set of viewership data, the first viewership count indicating total number of views of the first playback segment at the first time comprises:
generating the first viewership count for the first rendition segment;
generating a second viewership count for the third rendition segment; and
transmitting, to the data repository, the first viewership count comprising a sum of the first viewership count and the second viewership count.

9. The method of claim 1:
further comprising, during the first time:
generating a first unique viewership count based on the first set of viewership data comprising:
initiating the first unique viewership count indicating number of unique viewers in the first viewer population;
incrementing the unique viewership count in response to at least one view start event associated with a unique viewer ID in the first set of viewership data; and
decrementing the viewership count in response to at least one view-end event associated with a unique viewer ID in the first set of viewership data; and
wherein executing the script on the frame of the second rendition segment based on the first viewership count to generate a modified frame of the second modified rendition segment comprises:
executing the script on the frame of the second rendition segment based on the first viewership count and the first unique viewership count to generate a modified frame of the second modified rendition segment.

10. The method of claim 9:
wherein executing the script on the frame of the second rendition segment based on the first viewership count and the first unique viewership count to generate a modified frame of the second modified rendition segment comprises:
accessing values of the first viewership count and the first unique viewership count; and
modifying the frame to include the values of the first viewership count and the first unique viewership count.

11. The method of claim 1, further comprising:
at the first time:
  storing the first rendition segment in a cache; and
at the second time:
  receiving, from a third viewer population, a third request for the first playback segment of the video in the first rendition;
  accessing the first rendition segment, the first rendition segment comprising a third set of frames;
  generating a total viewership count based the first set of viewership data, the total viewership count indicating total number of views of the video;
  for each frame in the third set of frames:
    executing the script on the frame of the first rendition segment based on the total viewership count to generate a modified frame of the second modified rendition segment;
  transmitting the first modified rendition segment to the third viewer population; and
  updating the first set of viewership data for the first playback segment, comprising:
    aggregating third set of viewership data for the first rendition segment at the second time, the third set of viewership data indicating total number of views of the first playback segment at the second; and
    transmitting the third set of viewership data to a data repository.

12. The method of claim 11, further comprising:
at the third time:
  receiving, from a fourth viewer population, a fourth request for the first playback segment of the video in the first rendition;
  accessing the first rendition segment, the first rendition segment comprising a third set of frames;
  updating a total viewership count based on the updated first set of viewership data, the total viewership count comprising a sum of views of the video by the first viewer population, the second viewer population, and the third viewer population;
  for each frame in the third set of frames:
    executing the script on the frame of the first rendition segment based on the total viewership count to generate a modified frame of a first modified rendition segment;
  transmitting the first modified rendition segment to the fourth viewer population; and
  updating first set of viewership data for the first playback segment, comprising:
    aggregating third set of viewership data indicating total number of views of the first playback segment at the third time; and
    transmitting the third set of viewership data to the data repository.

13. The method of claim 1, further comprising:
at the first time:
  storing the first rendition segment in a cache with a metadata tag, the metadata tag comprising the first viewership count; and
at the second time:
  receiving, from a third viewer population, a third request for the first playback segment of the video in the first rendition;
  accessing the first rendition segment, the first rendition segment comprising a third set of frames;
  for each frame in the third set of frames:
    executing the script on the frame of the first rendition segment based on the first viewership count to generate a modified frame of a first modified rendition segment;
  transmitting the first modified rendition segment to the third viewer population;
  updating the first set of viewership data for the first playback segment, comprising:
    aggregating third set of viewership data for the first rendition segment at the second time; and
    transmitting the third set of viewership data to the data repository;
  generating a unique viewership count based on the first set of viewership data, the unique viewership count indicating total number of unique viewers of the video; and
  modifying the metadata tag to include the unique viewership count.

14. The method of claim 13, further comprising:
at the third time:
  receiving, from a fourth viewer population, a fourth request for the first playback segment of the video in the first rendition;
  accessing the first modified rendition segment and the metadata tag;
  for each frame in the third set of frames:
    executing the script on the frame of the first rendition segment based on the metadata tag to generate a modified frame of the first modified rendition segment; and
  transmitting the first modified rendition segment to the fourth viewer population.

15. The method of claim 14, wherein executing the script on the frame of the first rendition segment based on the metadata tag to generate the modified frame of the first modified rendition segment comprises:
accessing a value of unique viewership count; and
modifying the frame to include the unique viewership count.

16. A method comprises:
at a first time:
  receiving, from a first viewer population, a first request for a first playback segment of a video;
  generating a first rendition segment corresponding to the first playback segment;
  transmitting the first rendition segment to the first viewer population;
  aggregating a first set of viewership data for the first playback segment; and
  generating a first viewership count based on the first set of viewership data, the first viewership count corresponding to a first viewership data filter; and
at a second time:
  receiving a second request from a second viewer population for a second playback segment of the video;
  generating a second rendition segment corresponding to the first playback segment;
  modifying frames of the second rendition segment to include the first viewership count in a second modified rendition segment; and
  transmitting the second modified rendition segment to the second viewer population and the first viewership count.

17. The method of claim 16:
wherein aggregating the first set of viewership data for the first playback segment comprises:
- receiving a first set of beacon streams from the first viewer population, each beacon stream in the first set of beacon streams comprising a first set of beacon stream data and first set of metadata; and
- transmitting the first set of beacon stream data and the first set of metadata to a data repository.

18. The method of claim 16, further comprising:
at the second time:
- aggregating a second set of viewership data for the second playback segment; and
- generating a second viewership count based on the second set of viewership data, the second viewership count corresponding to the first viewership data filter; and at a third time:
- receiving a third request for a third playback segment in the first rendition from a third viewer population;
- generating a frame of a third rendition segment corresponding to the third playback segment;
- modifying frames of the third rendition segment to include the second viewership count in a third modified rendition segment; and
- transmitting the third modified rendition segment to the third viewer population.

19. The method of claim 16, further comprising:
at the first time:
- storing the first rendition segment in a cache; and at the second time:
- receiving, from a third viewer population, a third request for the first playback segment of the video in the first rendition;
- accessing the first rendition segment;
- generating a third viewership count based the first set of viewership data, the second viewership count corresponding to a second viewership data filter;
- modifying the first rendition segment to include the third viewership count in a first modified rendition segment; and
- transmitting the first modified rendition segment to the third viewer population.

20. The method of claim 16:
further comprising, at the first time:
- receiving, from a third viewer population, a third request for a first playback segment of the video in a second rendition;
- generating a third rendition segment in the second rendition, the third rendition segment corresponding to the first playback segment of the video in the second rendition; and
- transmitting the third rendition segment to the third viewer population;

wherein aggregating a first set of viewership data for the first playback segment comprises:
- aggregating the first set of viewership data for the first rendition segment and the third rendition segment; and
- transmitting to a data repository the first set of viewership data for the first rendition segment and the third rendition segment; and wherein generating the first viewership count based the first set of viewership data, the first viewership count corresponding to the first viewership data filter comprises:
- generating the first viewership count for the first rendition segment;
- generating a second viewership count for the third rendition segment; and
- transmitting, to a data repository, the first viewership count comprising a sum of the first viewership count and the second viewership count.

* * * * *